US012785557B2

(12) United States Patent
Scott et al.

(10) Patent No.: US 12,785,557 B2
(45) Date of Patent: Nov. 3, 2026

(54) DIRECT CURRENT-TO-DIRECT CURRENT (DC-DC) CONVERTER WITH PROGRAMMABLE COMPENSATION

(71) Applicant: Qorvo US, Inc., Greensboro, NC (US)

(72) Inventors: Baker Scott, San Jose, CA (US); George Maxim, Saratoga, CA (US); Nadim Khlat, Cugnaux (FR); Hui Liu, San Diego, CA (US); David Edward Reed, Calhan, CO (US); Christopher T. Brown, Sunnyvale, CA (US)

(73) Assignee: Qorvo US, Inc., Greensboro, NC (US)

( * ) Notice: Subject to any disclaimer, the term of this patent is extended or adjusted under 35 U.S.C. 154(b) by 246 days.

(21) Appl. No.: 18/605,031

(22) Filed: Mar. 14, 2024

(65) Prior Publication Data

US 2024/0339928 A1 Oct. 10, 2024

Related U.S. Application Data

(60) Provisional application No. 63/457,226, filed on Apr. 5, 2023.

(51) Int. Cl.
*H02M 3/156* (2006.01)
*H02M 1/00* (2006.01)
(Continued)

(52) U.S. Cl.
CPC ......... *H02M 3/156* (2013.01); *H02M 1/0009* (2021.05); *H02M 1/0025* (2021.05); *H02M 3/157* (2013.01); *H02M 3/158* (2013.01)

(58) Field of Classification Search
CPC ...... H02M 3/156; H02M 3/157; H02M 3/158; H02M 1/0009; H02M 1/0025
See application file for complete search history.

(56) References Cited

U.S. PATENT DOCUMENTS

| | | | | |
|---|---|---|---|---|
| 6,984,969 | B1 * | 1/2006 | Liu | H02M 3/158 323/280 |
| 7,332,904 | B1 * | 2/2008 | Menkus | H03K 19/0005 257/48 |

(Continued)

FOREIGN PATENT DOCUMENTS

| | | | |
|---|---|---|---|
| WO | WO-2019137602 A1 * | 7/2019 | H04L 5/0091 |
| WO | 2022139091 A1 | 6/2022 | |

OTHER PUBLICATIONS

Extended European Search Report for European Patent Application No. 24168766.4, mailed Aug. 29, 2024, 7 pages.

*Primary Examiner* — Lakaisha Jackson
(74) *Attorney, Agent, or Firm* — Withrow & Terranova, P.L.L.C.

(57) ABSTRACT

Systems and methods for providing a direct current-to-direct current (DC-DC) converter with programmable compensation are disclosed. In one aspect, a power management chip having a DC-DC converter measures process, voltage, and temperature (PVT) variations and provides a dynamic compensation circuit (e.g., using programmable digital-to-analog converters (DACs)) to offset such PVT variations. Further, changes in frequency may be detected, and additional compensation values provided. Providing compensation in this manner allows the DC-DC converter's performance to be more efficient, resulting in better performance and power savings.

17 Claims, 11 Drawing Sheets

(51) Int. Cl.
*H02M 3/157* (2006.01)
*H02M 3/158* (2006.01)

(56) References Cited

U.S. PATENT DOCUMENTS

| | | | | |
|---|---|---|---|---|
| 7,638,991 | B1 * | 12/2009 | Kobayashi | H02M 3/158<br>323/283 |
| 8,143,874 | B2 | 3/2012 | Templeton | |
| 10,432,088 | B1 | 10/2019 | Chang | |
| 11,012,067 | B2 | 5/2021 | Ruffieux et al. | |
| 2005/0149894 | A1 * | 7/2005 | Shimazaki | G06F 30/36<br>716/115 |
| 2010/0237468 | A1 * | 9/2010 | Daley | H01G 7/00<br>257/532 |
| 2013/0049723 | A1 * | 2/2013 | Latham, II | H02M 3/157<br>323/282 |
| 2013/0127430 | A1 * | 5/2013 | Leung | H02M 3/157<br>323/282 |
| 2014/0253081 | A1 * | 9/2014 | Duncan | H02M 3/158<br>323/284 |
| 2020/0152121 | A1 * | 5/2020 | Sung | G09G 3/3225 |
| 2021/0313876 | A1 * | 10/2021 | Kumar | H02M 1/44 |
| 2021/0382508 | A1 | 12/2021 | Nam et al. | |
| 2022/0037997 | A1 * | 2/2022 | Liang | H03F 3/2175 |
| 2022/0344963 | A1 * | 10/2022 | Nedic | H02J 7/00711 |
| 2023/0089910 | A1 * | 3/2023 | Duncan | H02M 1/0095<br>323/283 |

* cited by examiner

-PRIOR ART-

DIRECT CURRENT-TO-DIRECT CURRENT (DC-DC) CONVERTER WITH PROGRAMMABLE COMPENSATION

PRIORITY APPLICATION

This application claims the benefit of U.S. Provisional Patent Application Ser. No. 63/457,226, filed on Apr. 5, 2023, entitled "DIRECT CURRENT-TO-DIRECT CURRENT (DC-DC) CONVERTER WITH PROGRAMMABLE COMPENSATION," the disclosure of which is hereby incorporated herein by reference in its entirety.

BACKGROUND

I. Field of the Disclosure

The technology of the disclosure relates generally to direct current-to-direct current (DC-DC) converters and, more particularly, to DC-DC converters that have compensation for process, voltage, temperature (PVT), and/or frequency variations.

II. Background

Computing devices abound in modem society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to reduce power consumption. To this end, power management chips are used in conjunction with transceiver chains. These power management chips may be used to assist in adjusting a supply voltage to a power amplifier chain and may rely on direct current-to-direct current (DC-DC) converters to assist in adjusting the supply voltage. Current DC-DC converter topologies may be adequate for certain implementations, but the increasingly precise demands of emerging wireless technologies are placing additional demands on the DC-DC converters, creating opportunities for innovation.

SUMMARY

Aspects disclosed in the detailed description include systems and methods for providing a direct current-to-direct current (DC-DC) converter with programmable compensation. In particular, an exemplary aspect of the present disclosure measures process, voltage, and temperature (PVT) variations and provides a dynamic compensation circuit (e.g., using programmable digital to analog converters (DACs)) to offset such PVT variations. Further, changes in frequency may be detected, and additional compensation values provided. Providing compensation in this manner allows the DC-DC converter's performance to be more efficient, resulting in better performance and power savings.

In this regard, in one aspect, a power management circuit is disclosed. The power management circuit includes a DC-DC converter configured to be coupled to at least one external component, a sensor configured to measure a parameter associated with the DC-DC converter, an adjust circuit coupled to the DC-DC converter and configured to provide an adjustment to the DC-DC converter that affects the parameter measured, and a control circuit coupled to the sensor and the adjust circuit and configured to provide a signal to the adjust circuit that indicates how the adjust circuit should adjust the parameter measured.

In another aspect, a method of controlling a DC-DC converter is disclosed. The method of controlling a DC-DC converter comprises measuring an operating parameter associated with the DC-DC converter, comparing the measured operating parameter to an adjustment in a look-up table, and causing an adjust circuit to modify an on-chip element of a stabilizer filter associated with the DC-DC converter to compensate for instabilities in the DC-DC converter.

In another aspect, a mobile terminal is disclosed. The mobile terminal includes a power management circuit comprising: a DC-DC converter configured to be coupled to at least one external component and a sensor configured to measure a parameter associated with the DC-DC converter. The mobile terminal also includes an adjust circuit coupled to the DC-DC converter and configured to provide an adjustment to the DC-DC converter that affects the parameter measured and a control circuit coupled to the sensor and the adjust circuit and configured to provide a signal to the adjust circuit that indicates how the adjust circuit should adjust the parameter measured.

DETAILED DESCRIPTION

Figure 1:
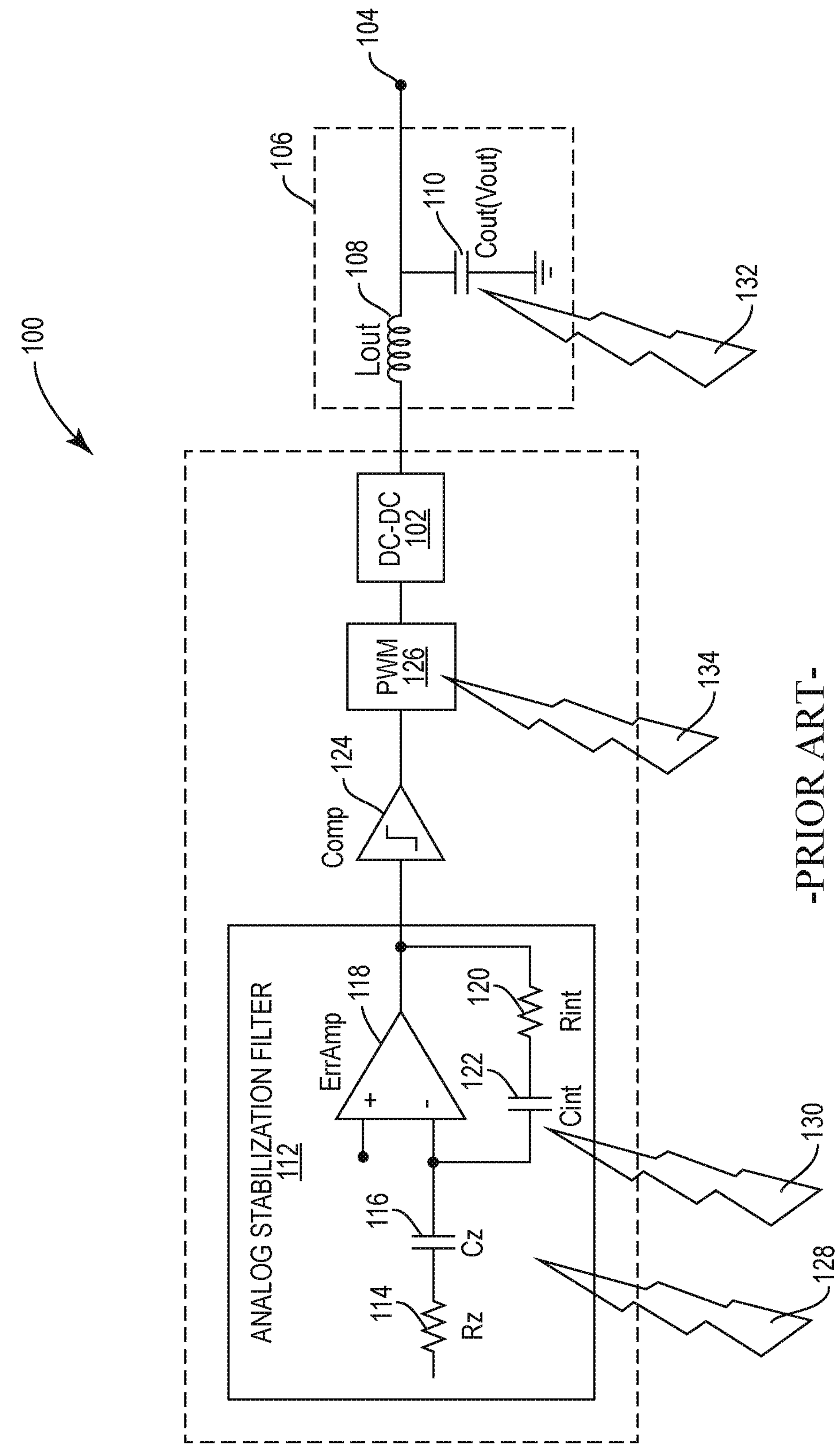
FIG. 1 is a block diagram of a conventional power management chip suffering from process, voltage, temperature, and frequency (PVTF) variations.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, no intervening elements are present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, no intervening elements are present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, no intervening elements are present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In keeping with the above admonition about definitions, the present disclosure uses transceiver in a broad manner. Current industry literature uses "transceiver" in two ways. The first way uses transceiver broadly to refer to a plurality of circuits that send and receive signals. Exemplary circuits may include a baseband processor, an up/down conversion circuit, filters, amplifiers, couplers, and the like coupled to one or more antennas. A second way, used by some authors in the industry literature, refers to a circuit positioned between a baseband processor and a power amplifier circuit as a transceiver. This intermediate circuit may include the up/down conversion circuits, mixers, oscillators, filters, and the like but generally does not include the power amplifiers. As used herein, the term transceiver is used in the first sense. Where relevant to distinguish between the two definitions, the terms "transceiver chain" and "transceiver circuit" are used respectively.

Aspects disclosed in the detailed description include systems and methods for providing a direct current-to-direct current (DC-DC) converter with programmable compensation. In particular, an exemplary aspect of the present disclosure measures process, voltage, and temperature (PVT) variations and provides a dynamic compensation circuit (e.g., using programmable digital to analog converters (DACs)) to offset such PVT variations. Further, changes in frequency may be detected, and additional compensation values provided. Providing compensation in this manner allows the DC-DC converter's performance to be more efficient, resulting in better performance and power savings.

Before addressing exemplary aspects of the present disclosure, a brief discussion of a traditional power management circuit and some of the vulnerabilities thereof is provided with reference to FIG. 1. With this context, exemplary aspects of the present disclosure are provided beginning below with reference to FIG. 2.

In this regard, FIG. 1 is a block diagram of a power management circuit 100, which may be instantiated in a distinct chip or die (and thus may be referred to as a power management chip) or may be incorporated into a larger integrated circuit (IC) or system on a chip (SoC). The power management circuit 100 may include a DC-DC converter (or another voltage converter) 102 that provides a supply voltage signal (generically Vout) at an output node 104. An output filter 106 may be used to filter the supply voltage signal. The output filter 106 may include an inductor 108 and a capacitor 110. In some implementations, the output filter 106 may include off-chip components.

With continued reference to FIG. 1, the power management circuit 100 may include a stabilization filter 112, which may be formed from analog components such as a resistor 114, a series capacitor 116, an error operational amplifier (op-amp) 118, a feedback resistor 120, and a series feedback capacitor 122. Additionally, the power management circuit 100 may include a threshold comparator 124 and a pulse width modulation (PWM) circuit 126. While the stabilization filter 112 compensates for certain aspects of the operation of the DC-DC converter 102, the stabilization filter 112 is a static device that does not adjust to operating conditions.

It should be appreciated that the power management circuit 100 may be subject to manufacturing process variations (arrow 128), temperature variations (arrow 130), voltage variations (arrow 132), (i.e., PVT variations), and/or clock frequency variations (arrow 134) (collectively referred to as PVTF). Process variations may arise during manufacturing (e.g., minor differences in doping concentrations) and are well documented and typically do not vary with time. In contrast, the temperature, voltage, and frequency may vary during operation and have various impacts on the power management circuit 100. For example, capacitors such as capacitor 110 may experience changes to their capacitance when voltages change (e.g., capacitor 110 may lose up to 80% of its value when operating at large Vout). Similarly, the inductor 108 may have different inductances based on the current. Temperature and frequency can also cause large changes in operation. Because the stabilization filter 112 is a static device, there is no adjustment made for these PVTF variations; the stability afforded by the stabilization filter 112 may be lacking. This instability may lead to ringing, overshoots, and increased settling time, all of which are generally considered undesirable and lead to poor performance.

Exemplary aspects of the present disclosure add calibration loops that keep the DC-DC converter constant across PVTF variations. These loops include sensors to detect the operating condition coupled with scaling factors that are used with digital analog controllers (DACs) to adjust operating elements within the power management circuit to offset changes caused by the PVTF variations. The scaling factors may be stored in a look-up table (LUT), calculated based on programmed algorithms, or the like.

Figure 2:
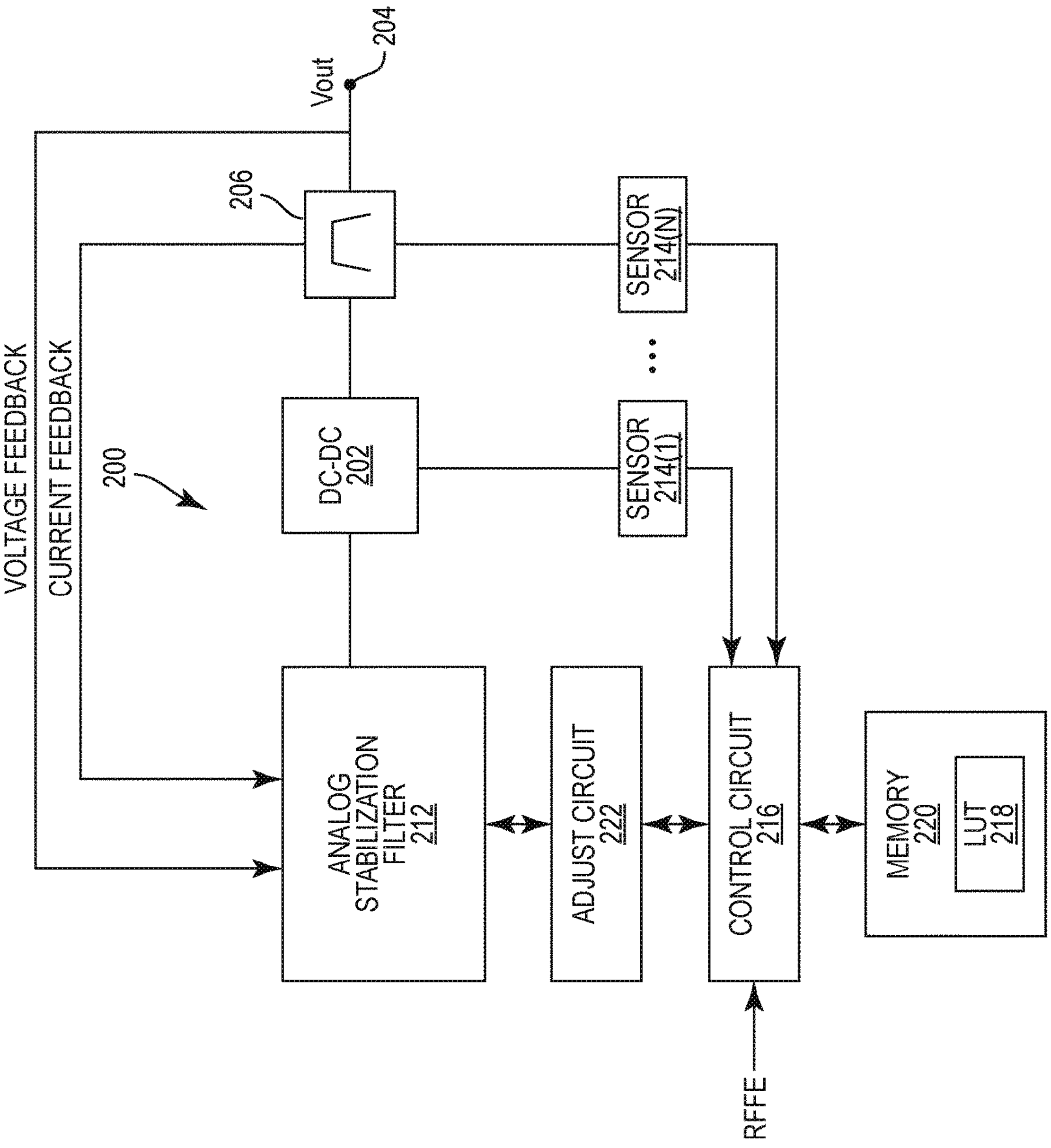
FIG. 2 is a block diagram of an exemplary power management chip with calibration and compensation loops to correct PVTF variations.

FIG. 2 provides a block diagram of a power management chip 200 having a DC-DC converter 202 that provides a supply voltage signal (generically Vout) at an output node 204. An output filter 206 may be used to filter the supply voltage signal. The output filter 206 may include an inductor (not shown) and a capacitor (not shown). In some implementations, the output filter 206 may include off-chip components.

The power management chip 200 also includes a stabilization filter 212, which likely includes one or more analog components (not shown). The present disclosure contemplates one or more sensors 214(1)-214(N) that measure or report operating conditions (e.g., voltage, current, temperature, frequency, or the like) or values impacted by operating conditions (e.g., capacitance, inductance, resistance, or the like) to a control circuit 216. Note that some of these values may come from external sources such as a baseband processor (not shown) coupled to the control circuit 216 through a communication bus such as a radio frequency front end (RFFE) bus. The control circuit 216 may convert the reported values to scaling factors and calculate using a stored algorithm or look up scaling factors stored in a look-up table (LUT) 218 in a memory 220. The control circuit 216 may further balance competing scaling factors depending on some prioritization scheme (e.g., keeping bandwidth stable having priority over damping or vice versa) and send signals to an adjust circuit 222.

The adjust circuit 222 includes one or more elements that provide compensation to the stabilization filter 212 to compensate for changes in the operation of the power management chip 200 as indicated by the sensors 214(1)-214(N). In a specifically contemplated aspect, the adjust circuit 222 may be formed from pluralities of switched digital to analog converters (DACs) that switch in and out resistors, inductors, capacitors, or other elements to provide adjustments to elements in the stabilization filter 212. While DACs are contemplated to create a hybrid digital-analog control, the present disclosure is not so limited, and a strictly analog solution may be provided with varactors or the like.

It should be further appreciated that the power management chip 200 (and subsequent variations described below) may include a voltage feedback loop that measures output voltage at output node 204. This information may be used to inform elements in the stabilization filter 212 as needed or desired. Additionally, or alternatively, this information may be shared with the control circuit 216 to assist in controlling adjust circuit 222 as needed or desired. Further, the power management chip 200 may include a current feedback loop that measures current (e.g., across an inductor in the filter 206). This information may be used to inform elements of the stabilization filter 212 as needed or desired. Additionally, or alternatively, this information may be shared with the control circuit 216 to assist in controlling adjust circuit 222 as needed or desired. Instead of using the information to control the adjust circuit 222, the information from these feedback loops may be used as part of calibration routines as needed or desired.

Aspects of the present disclosure contemplate using the sensors and other reporting elements to calibrate the stabilization filter 212 for process variations and compensate for changes that may occur from operating conditions. With these two corrections provided, the stabilization loop for the DC-DC converter is better able to provide appropriate stabilization for the DC-DC converter across a variety of operating conditions. This results in the more efficient operation of the DC-DC converter and a better user experience. As noted, priority can be provided for smooth and rapid damping, maintaining bandwidth, or the like. Alternatively, there may be some a priori determination of the best compromise between competing stabilization requirements. In either event, more details for the calibration and compensation loops are provided below.

Figure 3:
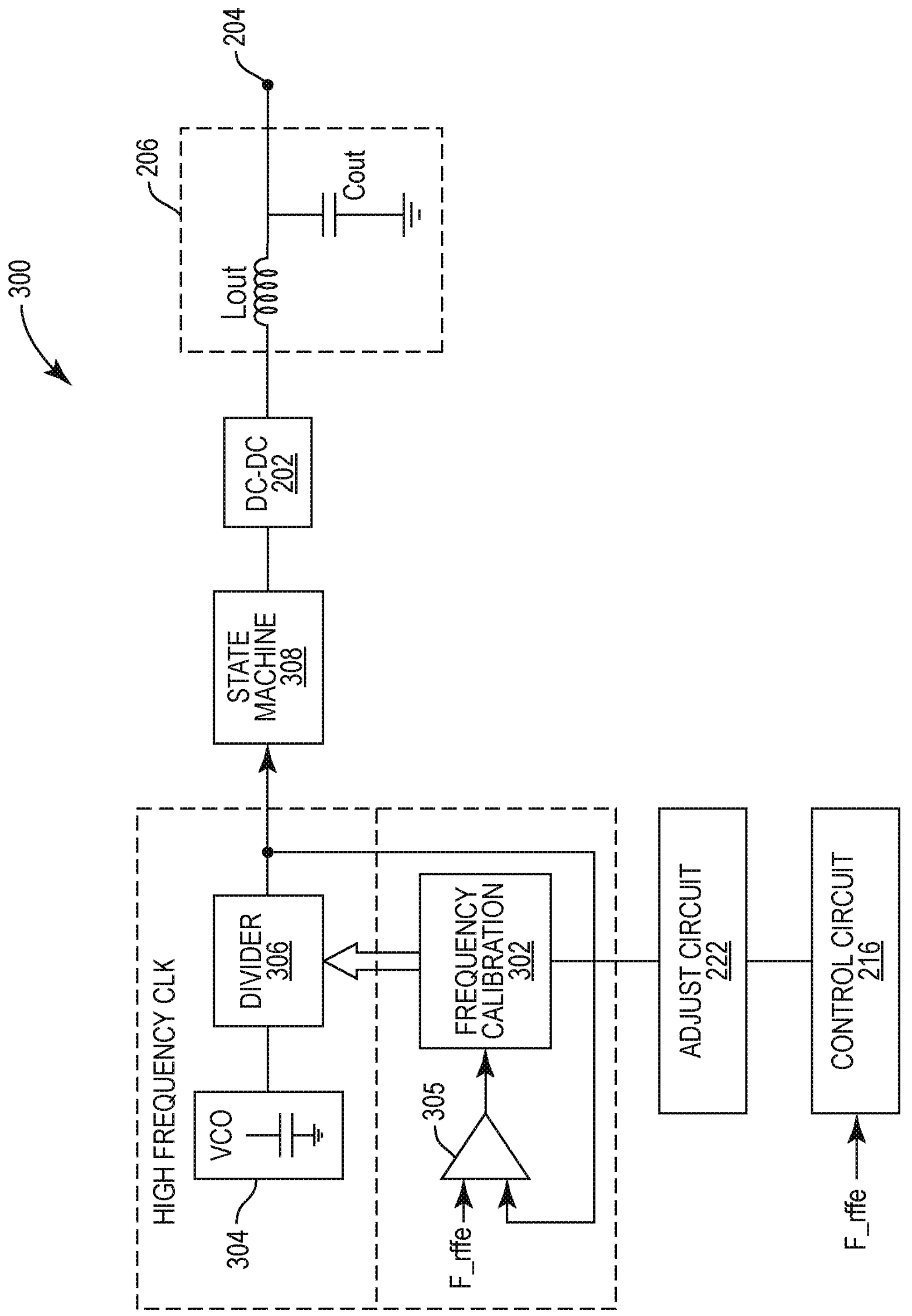
FIG. 3 is a block diagram of a power management chip having a frequency calibration and compensation loop to compensate for frequency variations.

In this regard, FIG. 3 provides a block diagram of a power management chip 300 having many of the same elements as power management chip 200 with a specific frequency calibration and compensation circuit 302 illustrated. In particular, the control circuit 216 may receive an off-clock signal having a stable and known frequency through the communication bus (e.g., F_rffe). A local, on-chip voltage-controlled oscillator (VCO) 304 may be calibrated to the off-clock signal through a feedback comparator 305. The signal from the VCO 304 may be divided by a known divider 306 to provide a switching signal at a known frequency to a state machine 308, which may control the DC-DC converter 202. The control circuit 216 may use this frequency knowledge to make adjustments to frequency-dependent elements via the adjust circuit 222.

Figure 4:
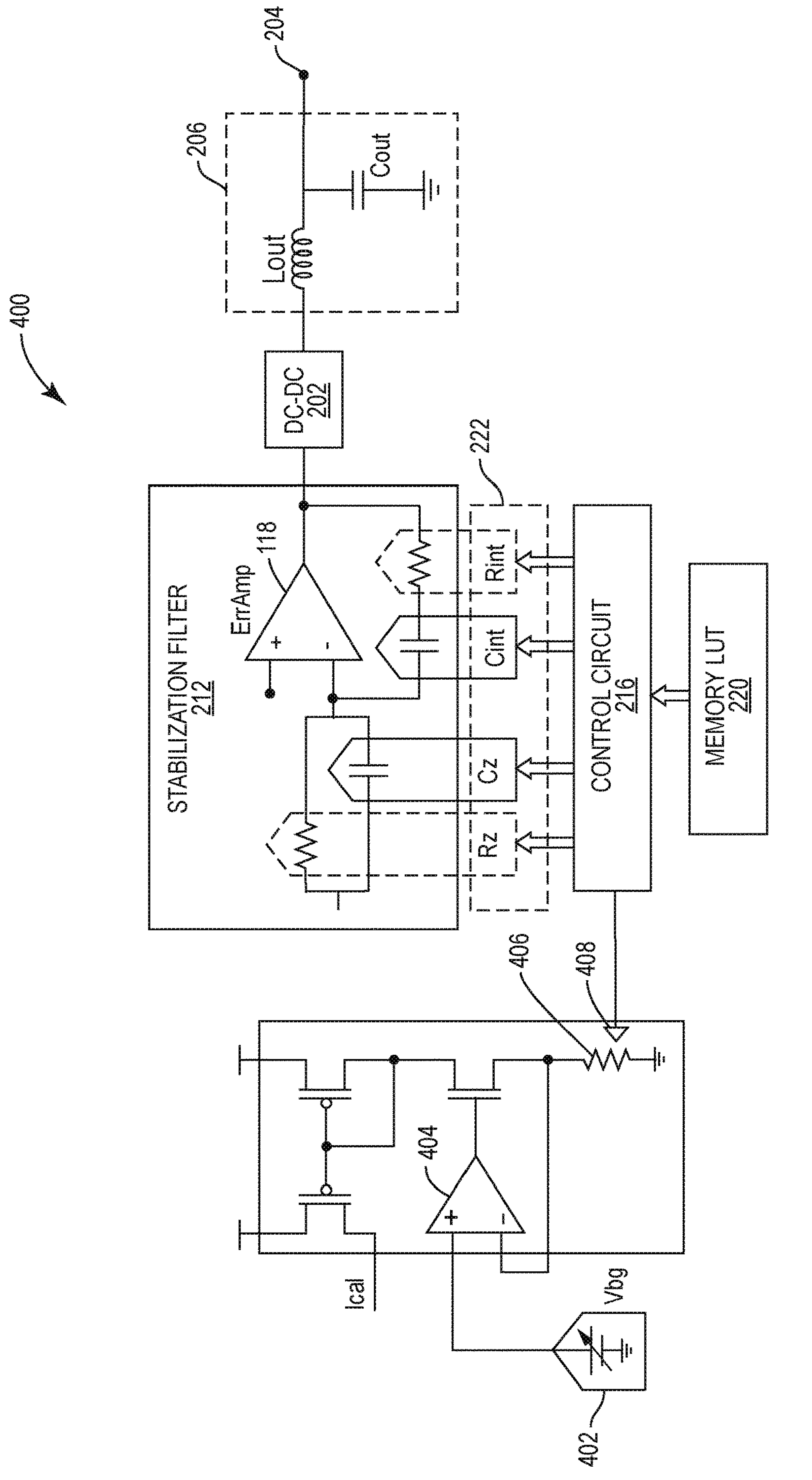
FIG. 4 is a block diagram of a power management chip having a resistance calibration and compensation loop to compensate for process and/or voltage variations in resistance.

FIG. 4 provides a block diagram of a power management chip 400 with many of the same elements as the power management chip 200 with a specific implementation for correction of on-chip resistance variation that may result from process variations. On-chip resistors may have a very loose tolerance as a function of manufacturing processes, and it is not uncommon for variations around twenty-five percent to be present. Accordingly, the power management chip 400 may have a calibrated bandgap voltage source 402 that provides a known, stable voltage Vbg. This voltage is provided to an operational amplifier 404 to create a known current through an on-chip resistor 406. The voltage across the resistor 406 may be measured by a sensor 408; since the current is known, the resistance can be calculated. This calculated resistance can be compared to a theoretical design value that was intended for the resistance, and an R_scale factor may be determined by the control circuit 216. This R_scale factor can be compared to values in the LUT in the memory 220 to determine how to adjust the various DACs in the adjust circuit 222 so as to adjust resistors and capacitors in the stabilization filter 212.

Figure 5:
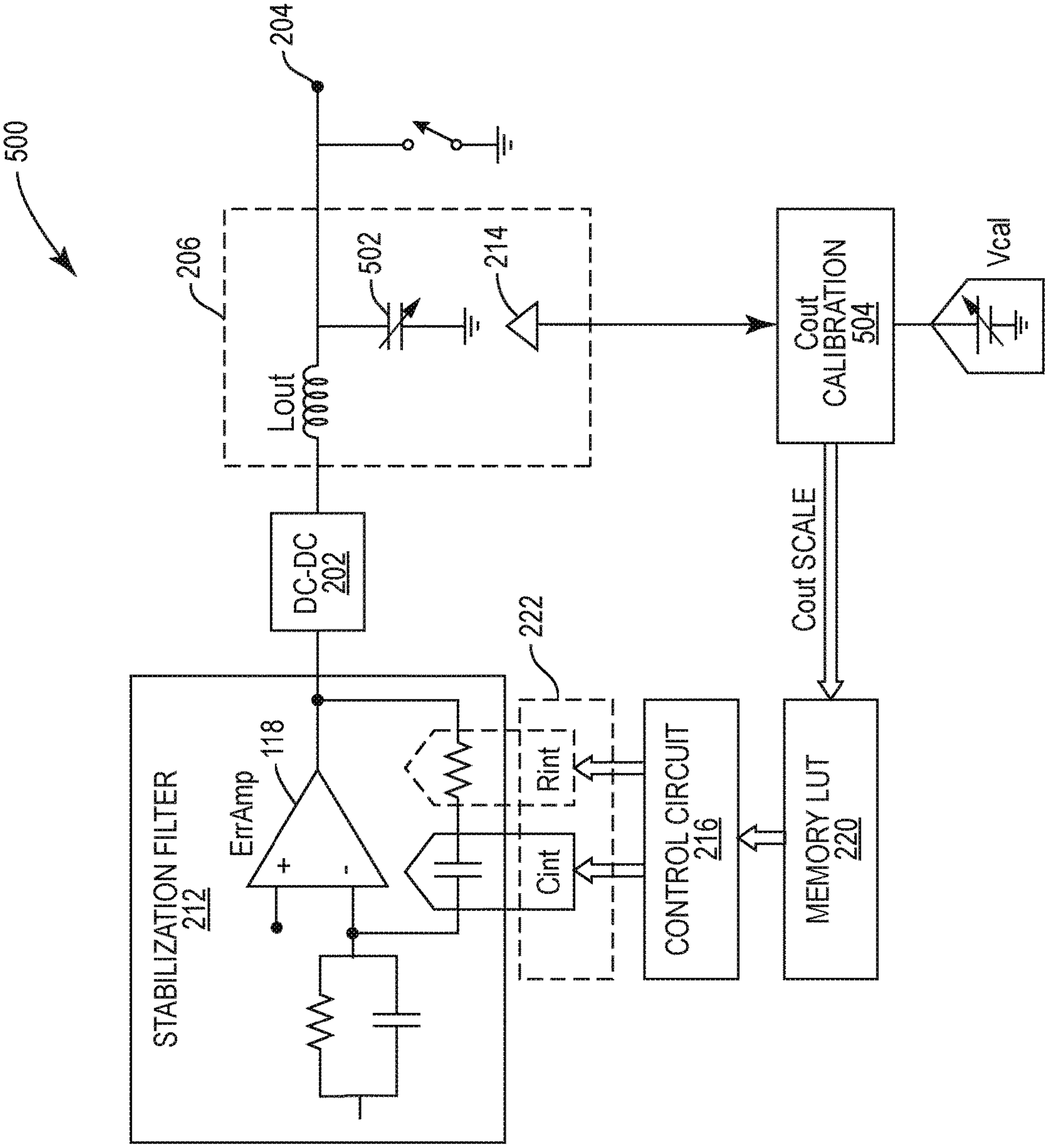
FIG. 5 is a block diagram of a power management chip having a capacitance calibration and compensation loop to compensate for process and/or voltage variations in capacitance.

FIG. 5 provides a block diagram of a power management chip 500 with many of the same elements as the power management chip 200 with a specific implementation for correcting the variations in capacitance as a function of voltage. In this regard, the control circuit 216 will measure the performance of capacitors such as output capacitor 502 in the filter 206. This measurement may be made with appropriate sensor 214. Calibration circuitry 504 may link the voltages to specific capacitances and store them or a scale factor in the memory 220. The control circuit 216 uses the values in the memory 220 (or calculates using an algorithm) to make adjustments to DACs in the stabilization filter 212 through the adjust circuit 222.

Figure 6:
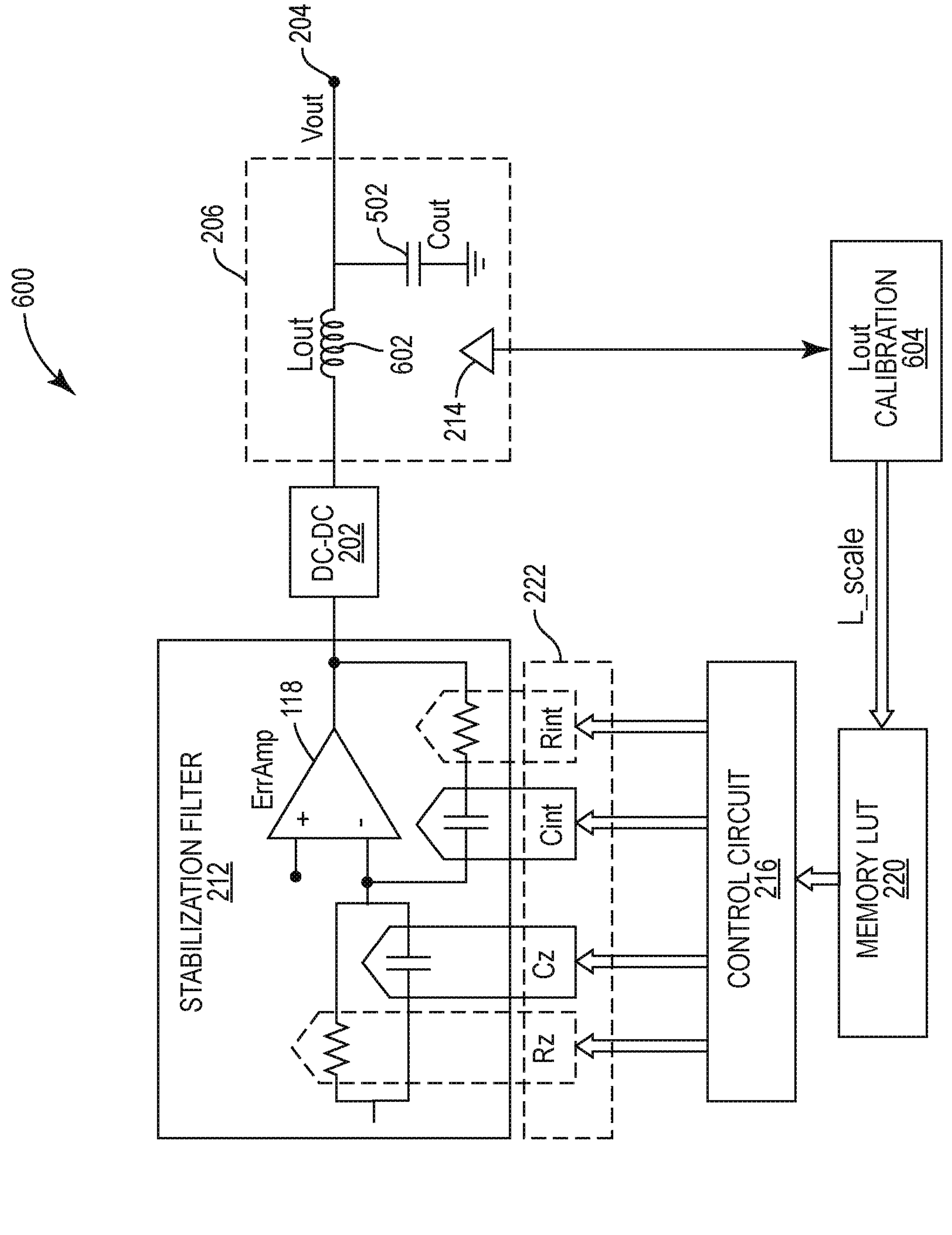
FIG. 6 is a block diagram of a power management chip having an inductance calibration and compensation loop to compensate for process and/or current (voltage) variations in inductance.

FIG. 6 provides a block diagram of a power management chip 600 having many of the same elements as the power management chip 200 with a specific implementation for correction for the variations in inductance as a function of current. In this regard, the control circuit 216 will measure the performance of inductors such as output inductor 602 in the filter 206. This measurement may be made with appropriate sensor 214. Calibration circuitry 604 may link the currents to specific inductances and store them or a scale factor in the memory 220. The control circuit 216 uses the values in the memory 220 (or calculates using an algorithm) to make adjustments to the DACs in the stabilization filter 212 through the adjust circuit 222.

Figure 7:
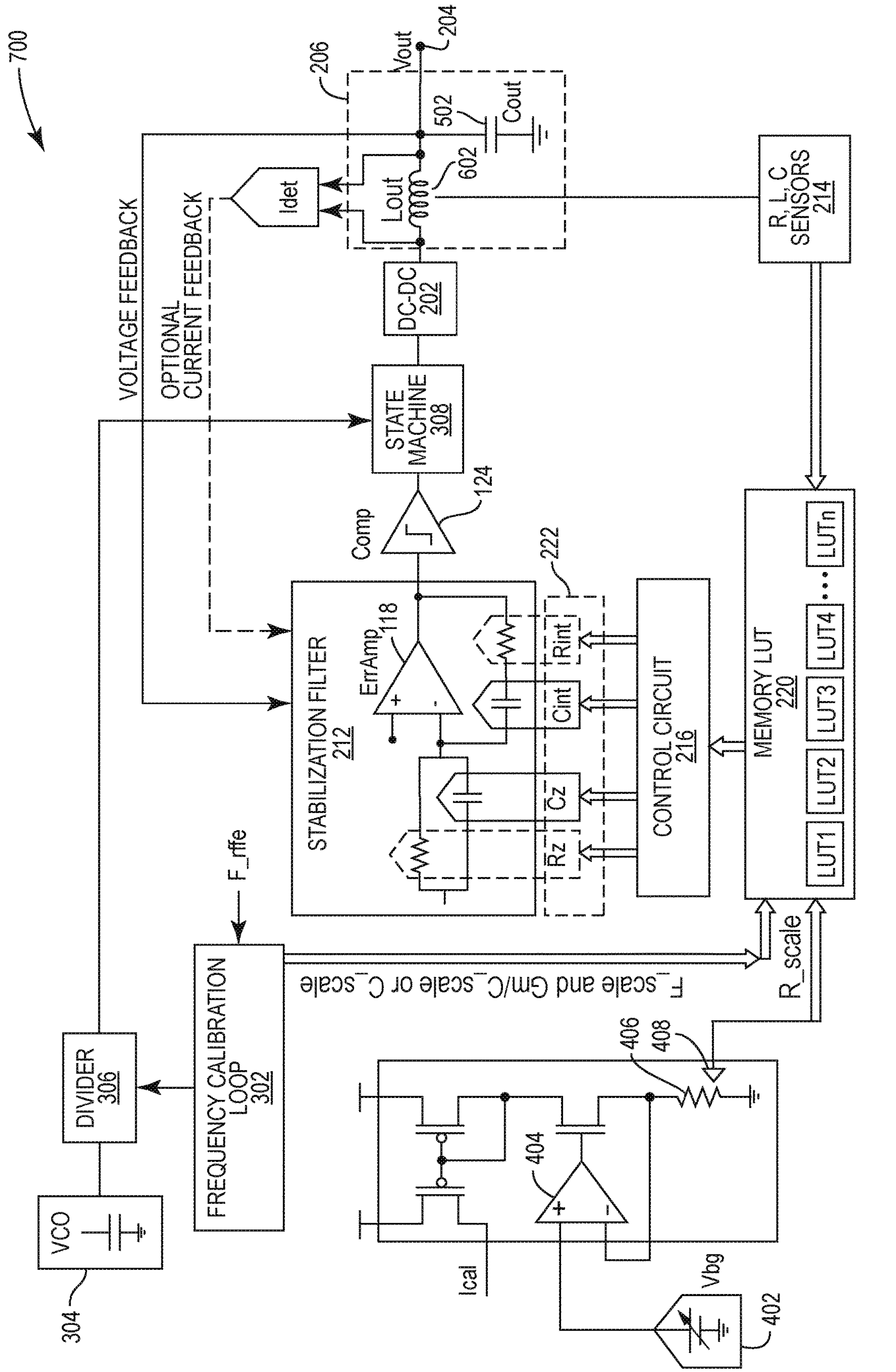
FIG. 7 is a block diagram of a power management chip combining several calibration and compensation loops described above.

FIG. 7 provides a block diagram of a power management chip 700 having the calibration circuits of power management chips 300, 400, 500, and 600 combined into a single chip. It should be appreciated that while the calibration circuits are shown distinctly in the previous figures and all combined in this figure, the present disclosure supports mixing and matching calibration circuits as needed or desired. Thus, the resistance and capacitance calibration circuits could be combined without using the frequency or inductance calibration circuits, or the frequency and capacitance calibration circuits could be combined. The various distinct permutations are all contemplated within the present disclosure.

Figure 8:
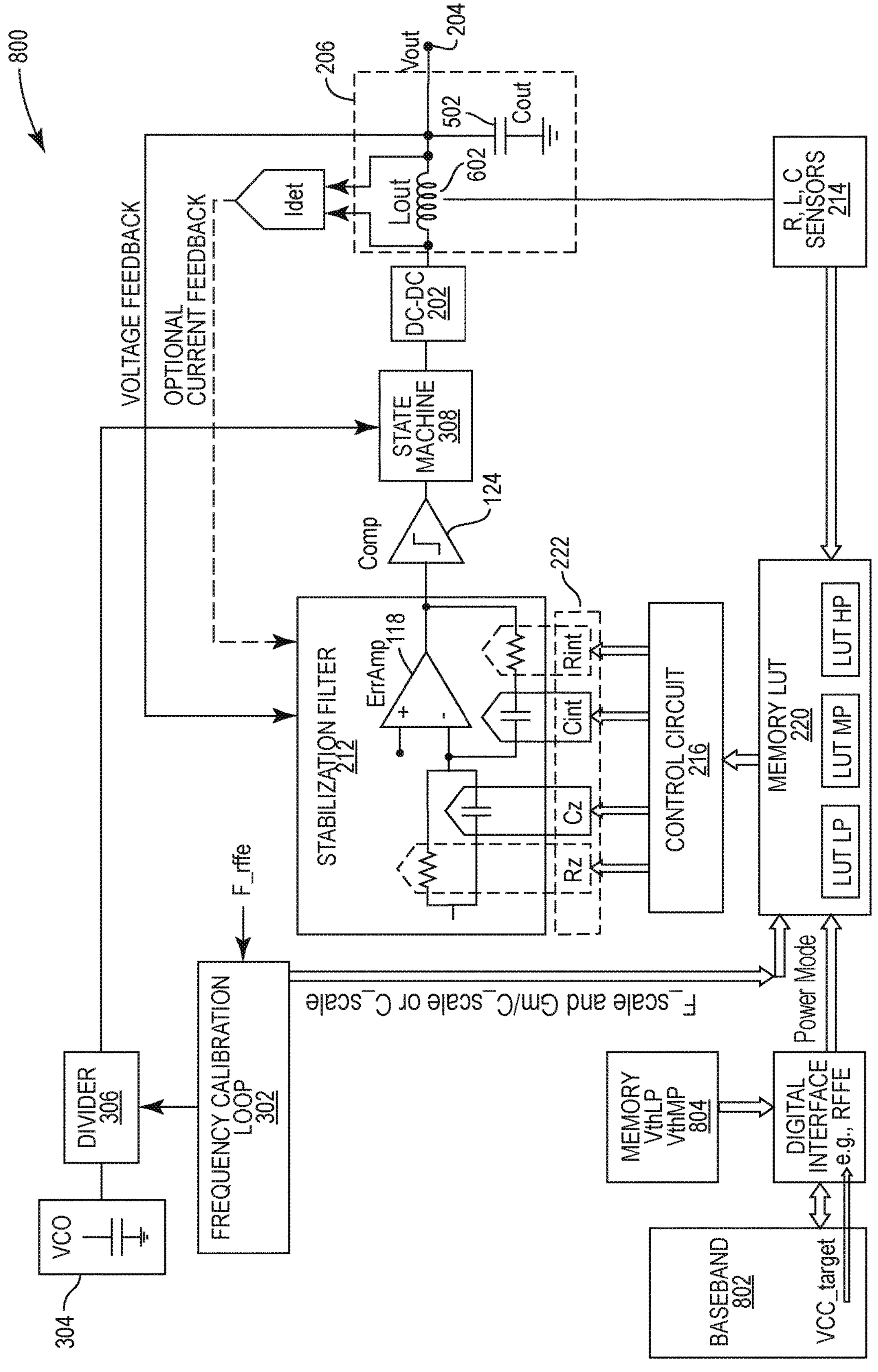
FIG. 8 is a block diagram of a power management chip combining several calibration and compensation loops described above, as well as a voltage mode compensation loop.

In addition to sensors 214 that measure elements on-chip and off-chip, there may be direct reporting of values that may affect the operation. For example, the DC-DC converter 202 may operate in various voltage modes (e.g., low, middle, and high voltages) corresponding to voltages produced at the output node 204. In this regard, FIG. 8 provides a block diagram of a power management chip 800 that receives a target output voltage from a baseband processor 802 (e.g., through the RFFE communication bus). A memory 804 may compare the target voltage to thresholds (e.g., VthLP, VthMP) to provide information to the memory 220 or control circuit 216 regarding the mode used. Based on this information or in conjunction with information from other calibration circuits, the control circuit 216 may provide instructions to the adjust circuit 222 to change the values of the stabilization filter 212.

Figure 9:
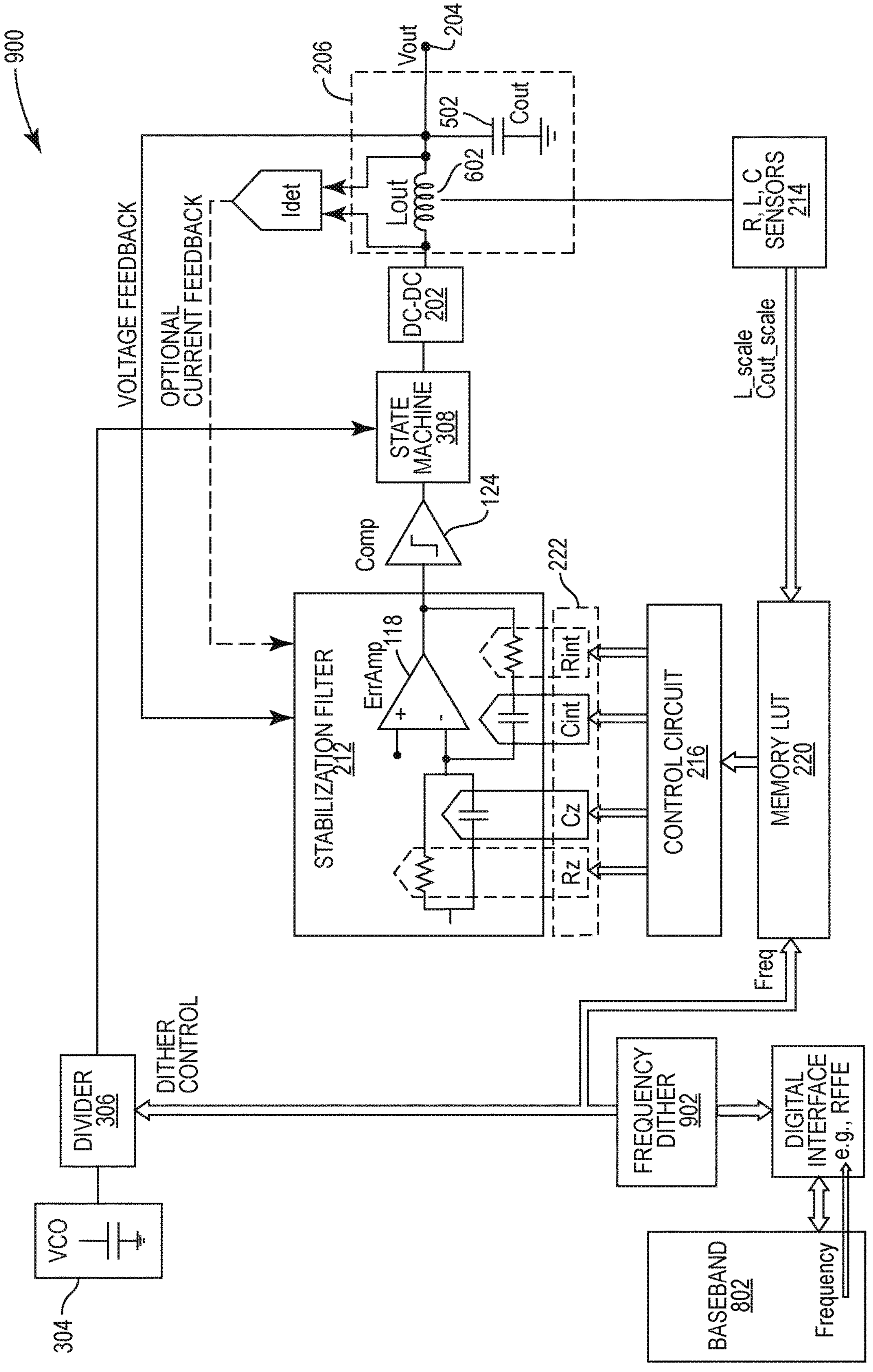
FIG. 9 is a block diagram of a power management chip combining several calibration and compensation loops described above, as well as a frequency compensation loop.

In addition to target voltage information, the baseband processor 802 may provide target frequency information over the RFFE bus, as better seen in FIG. 9. In FIG. 9, a power management chip 900 may include a frequency dither circuit 902 (or another circuit) that may report the frequency to the control circuit 216, which may use the LUT in the memory 220 to provide frequency-based adjustments through the adjust circuit 222.

As suggested earlier, with the myriad possible sources of adjustments, the control circuit 216 may prioritize specific stability factors and select adjustments accordingly. Alternatively, a large LUT with optimized compromises from all possible inputs and adjustments is used.

Figure 10:
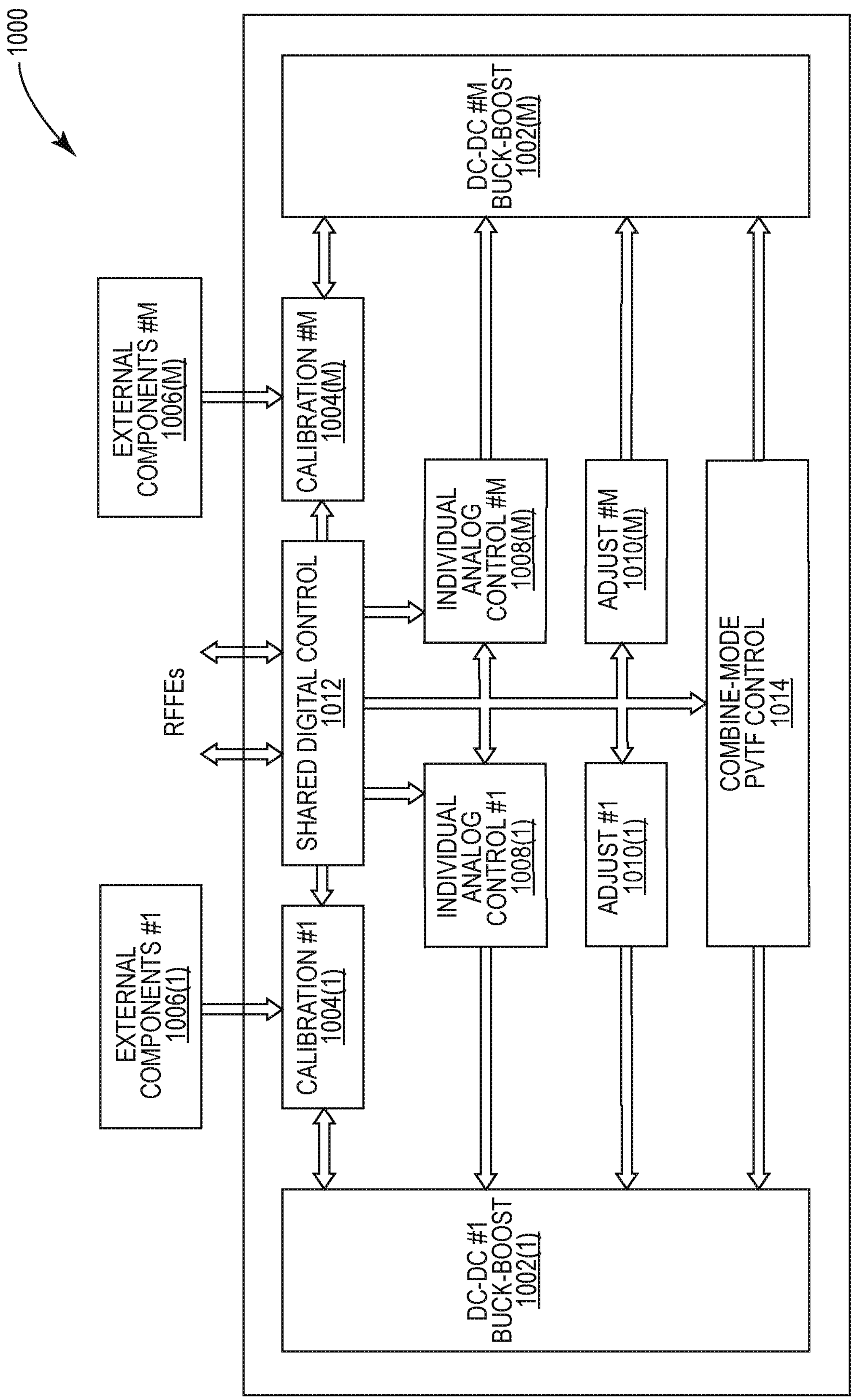
FIG. 10 is a block diagram of a power management chip having multiple voltage converters, each having respective PVTF calibration and compensation loops, as well as a mechanism to coordinate the loops when the voltage converters operate cumulatively.

While the above discussion focuses on the concept of a single DC-DC converter being used in a power management chip, the present disclosure is not so limited. Thus, FIG. 10 illustrates a power management chip 1000 with multiple DC-DC converters 1002(1)-1002(M) (only two are shown, but more are possible). Each DC-DC converter 1002(1)-1002(M) may have supporting calibration circuitry 1004(1)-1004(M), that measure external components 1006(1)-1006(M) and contribute to adjustments made by control circuits 1008(1)-1008(M) using adjust circuits 1010(1)-1010(M) as described above. In addition, a shared digital control circuit 1012 and a combined adjust circuit 1014 may be present; the shared digital control circuit 1012 and a combined adjust circuit 1014 control adjustments made when the DC-DC converters 1002(1)-1002(M) are operating cooperatively.

Figure 11:
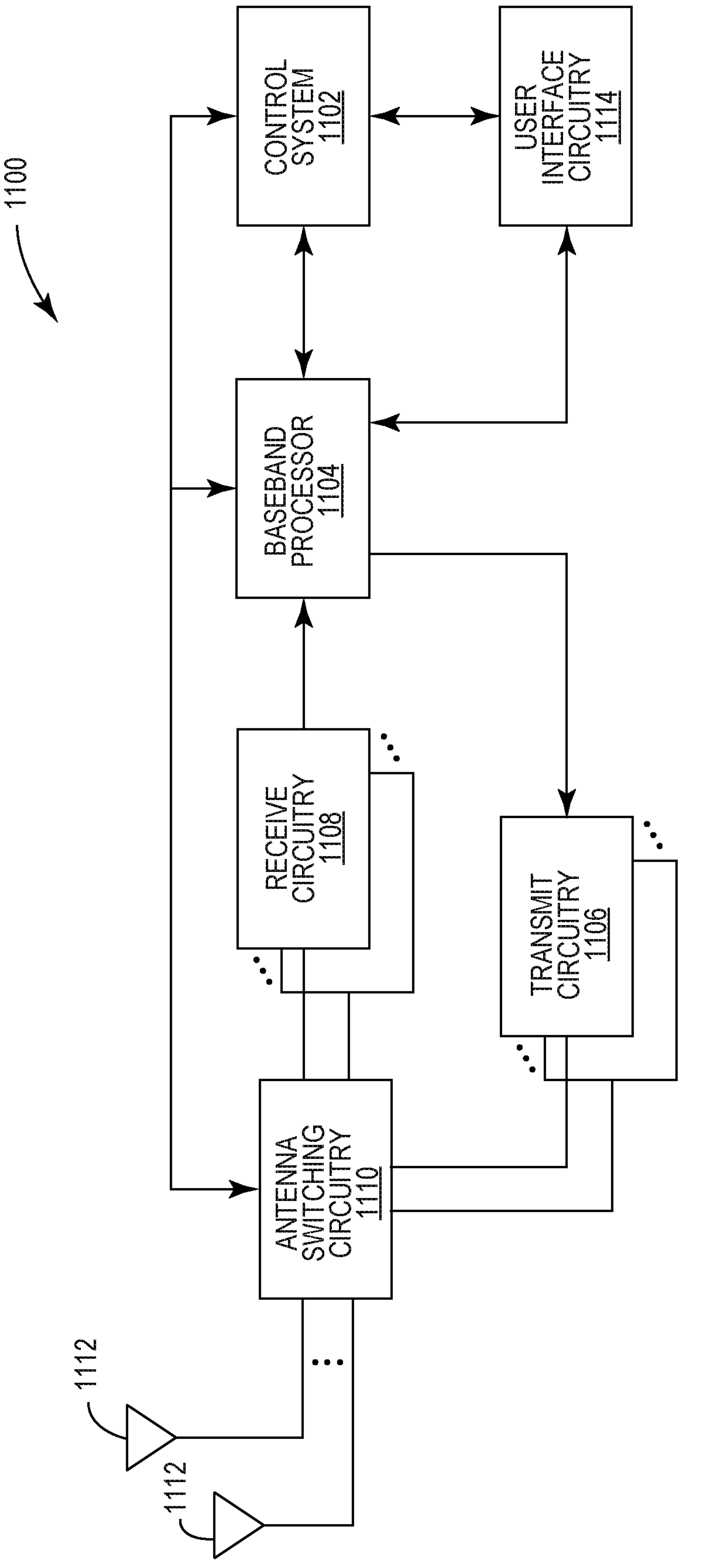
FIG. 11 is a block diagram of a mobile terminal, which may include the power management chips of FIGS. 2-10 according to the present disclosure.

With reference to FIG. 11, the power management circuits described above may be implemented in various types of user elements 1100, such as mobile terminals, smart watches, tablets, computers, navigation devices, access points, and like wireless communication devices that support wireless communications, such as cellular, wireless local area network (WLAN), Bluetooth, and near field communications. The user elements 1100 will generally include a control system 1102, a baseband processor 1104, transmit circuitry 1106, receive circuitry 1108, antenna switching circuitry 1110, multiple antennas 1112, and user interface circuitry 1114. In a non-limiting example, the control system 1102 can be a field-programmable gate array (FPGA) or an application-specific integrated circuit (ASIC), as an example. In this regard, the control system 1102 can include at least a microprocessor(s), an embedded memory circuit(s), and a communication bus interface(s). The receive circuitry 1108 receives radio frequency signals via the antennas 1112 and through the antenna switching circuitry 1110 from one or more base stations. A low noise amplifier and a filter of the receive circuitry 1108 cooperate to amplify and remove broadband interference from the received signal for processing. Downconversion and digitization circuitry (not shown) will then downconvert the filtered, received signal to an intermediate or baseband frequency signal, which is then digitized into one or more digital streams using an analog-to-digital converter(s) (ADC).

The baseband processor 1104 processes the digitized received signal to extract the information or data bits conveyed in the received signal. This processing typically comprises demodulation, decoding, and error correction operations. The baseband processor 1104 is generally implemented in one or more digital signal processors (DSPs) and ASICs.

For transmission, the baseband processor 1104 receives digitized data, which may represent voice, data, or control information, from the control system 1102 that it encodes for transmission. The encoded data is output to the transmit circuitry 1106, where a digital-to-analog converter(s) (DAC) converts the digitally encoded data into an analog signal, and a modulator modulates the analog signal onto a carrier signal that is at a desired transmit frequency or frequencies. A power amplifier will amplify the modulated carrier signal to a level appropriate for transmission and deliver the modulated carrier signal to the antennas 1112 through the antenna switching circuitry 1110 to the antennas 1112. According to the present disclosure, power management circuits may work with the power amplifier to assist in providing efficient operation of the power amplifier. The multiple antennas 1112 and the replicated transmit and receive circuitries 1106, 1108 may provide spatial diversity. Modulation and processing details will be understood by those skilled in the art.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A power management circuit comprising:
- a direct current-to-direct current (DC-DC) converter configured to be coupled to at least one external component;
- a sensor configured to measure a parameter associated with the DC-DC converter, wherein the parameter is at least one of a process variation of the external component, a temperature, a capacitance, a resistance, and an inductance;
- a stabilization filter circuit coupled to the DC-DC converter;
- an adjust circuit coupled to the DC-DC converter through the stabilization filter circuit and configured to provide an adjustment to the stabilization filter circuit for the DC-DC converter that affects the parameter measured; and
- a control circuit coupled to the sensor and the adjust circuit and configured to provide a signal to the adjust circuit that indicates how the adjust circuit should adjust the parameter measured.

2. The power management circuit of claim 1, wherein a second parameter measured is a voltage at an output of the DC-DC converter, and wherein the signal form the control circuit is further based on the second parameter.

3. The power management circuit of claim 1, wherein the adjust circuit comprises one or more digital to analog converters (DACs).

4. The power management circuit of claim 3, wherein the adjust circuit is configured to adjust an on-chip capacitance associated with the DC-DC converter to adjust the parameter measured.

5. The power management circuit of claim 3, wherein the adjust circuit is configured to adjust an on-chip resistance associated with the DC-DC converter to adjust the parameter measured.

6. The power management circuit of claim 3, wherein the adjust circuit is configured to adjust an on-chip inductance associated with the DC-DC converter to adjust the parameter measured.

7. The power management circuit of claim 1, wherein the control circuit is configured to receive a target voltage from a baseband processor.

8. The power management circuit of claim 1, wherein the control circuit is configured to receive a frequency range from a baseband processor.

9. The power management circuit of claim 1, further comprising a memory with a look-up table (LUT) coupled to the control circuit.

10. The power management circuit of claim 1, wherein the sensor is configured to measure a current.

11. The power management circuit of claim 1, wherein the sensor is configured to measure a voltage.

12. The power management circuit of claim 1, further comprising a voltage feedback loop coupling an output of the DC-DC converter to the stabilizer filter.

13. The power management circuit of claim 1, further comprising a current feedback loop coupling an output of the DC-DC converter to the stabilizer filter.

14. A method of controlling a direct current to direct current (DC-DC) converter, comprising:
- measuring an operating parameter associated with the DC-DC converter, wherein the parameter is at least one of: a temperature, a process variation, a capacitance, an inductance, and a resistance;
- comparing the measured operating parameter to an adjustment in a look-up table; and
- causing an adjust circuit to modify an on-chip element of a stabilizer filter associated with the DC-DC converter to compensate for instabilities in the DC-DC converter.

15. A mobile terminal comprising:
- a power management circuit comprising:
  - a direct current-to-direct current (DC-DC) converter configured to be coupled to at least one external component;
  - a sensor configured to measure a parameter associated with the DC-DC converter, wherein the parameter is at least one of a process variation of the external component, a temperature, a capacitance, a resistance, and an inductance;
  - a stabilization filter circuit coupled to the DC-DC converter;
  - an adjust circuit coupled to the DC-DC converter through the stabilization filter circuit and configured to provide an adjustment to the stabilization filter circuit for the DC-DC converter that affects the parameter measured; and
  - a control circuit coupled to the sensor and the adjust circuit and configured to provide a signal to the adjust circuit that indicates how the adjust circuit should adjust the parameter measured.

16. The mobile terminal of claim 15, further comprising a power amplifier coupled to an output of the power management circuit.

17. The mobile terminal of claim 15, wherein the adjust circuit comprises one or more digital to analog converters (DACs).

* * * * *